United States Patent [19]

Batishko et al.

[11] Patent Number: 4,956,558
[45] Date of Patent: Sep. 11, 1990

[54] SYSTEM FOR MEASURING FILM THICKNESS

[75] Inventors: Charles R. Batishko, West Richland; Leslie J. Kirihara; Timothy J. Peters; Donald E. Rasmussen, all of Richland, Wash.

[73] Assignee: Battelle Memorial Institute, Richland, Wash.

[21] Appl. No.: 324,086

[22] Filed: Mar. 16, 1989

[51] Int. Cl.[5] ............................................. G01N 21/64
[52] U.S. Cl. .................................. 250/461.1; 250/301
[58] Field of Search ............................. 250/461.1, 301

[56] References Cited

U.S. PATENT DOCUMENTS 4,799,756  1/1989  Hirschfeld ........................ 350/96.18

FOREIGN PATENT DOCUMENTS 2907620  8/1980  Fed. Rep. of Germany ...... 356/436
57-86743  5/1982  Japan ................................. 250/461.1

OTHER PUBLICATIONS

A. E. Smart and R. A. J. Ford; "Measurement of Thin Liquid Films by a Fluorescence Technique," Wear, Vol. 29, No. 1 (Jul. 1974); pp. 41-47 [Copyright © 1974 Elsevier Sequoia S. A., Lausanne]

Primary Examiner—Constantine Hannaher
Attorney, Agent, or Firm—Dellett, Smith-Hill and Bedell

[57] ABSTRACT

A system for determining the thicknesses of thin films of materials exhibiting fluorescence in response to exposure to excitation energy from a suitable source of such energy. A section of film is illuminated with a fixed level of excitation energy from a source such as an argon ion laser emitting blue-green light. The amount of fluorescent light produced by the film over a limited area within the section so illuminated is then measured using a detector such as a photomultiplier tube. Since the amount of fluorescent light produced is a function of the thicknesses of thin films, the thickness of a specific film can be determined by comparing the intensity of fluorescent light produced by this film with the intensity of light produced by similar films of known thicknesses in response to the same amount of excitation energy. The preferred embodiment of the invention uses fiber optic probes in measuring the thicknesses of oil films on the operational components of machinery which are ordinarily obscured from view.

29 Claims, 3 Drawing Sheets

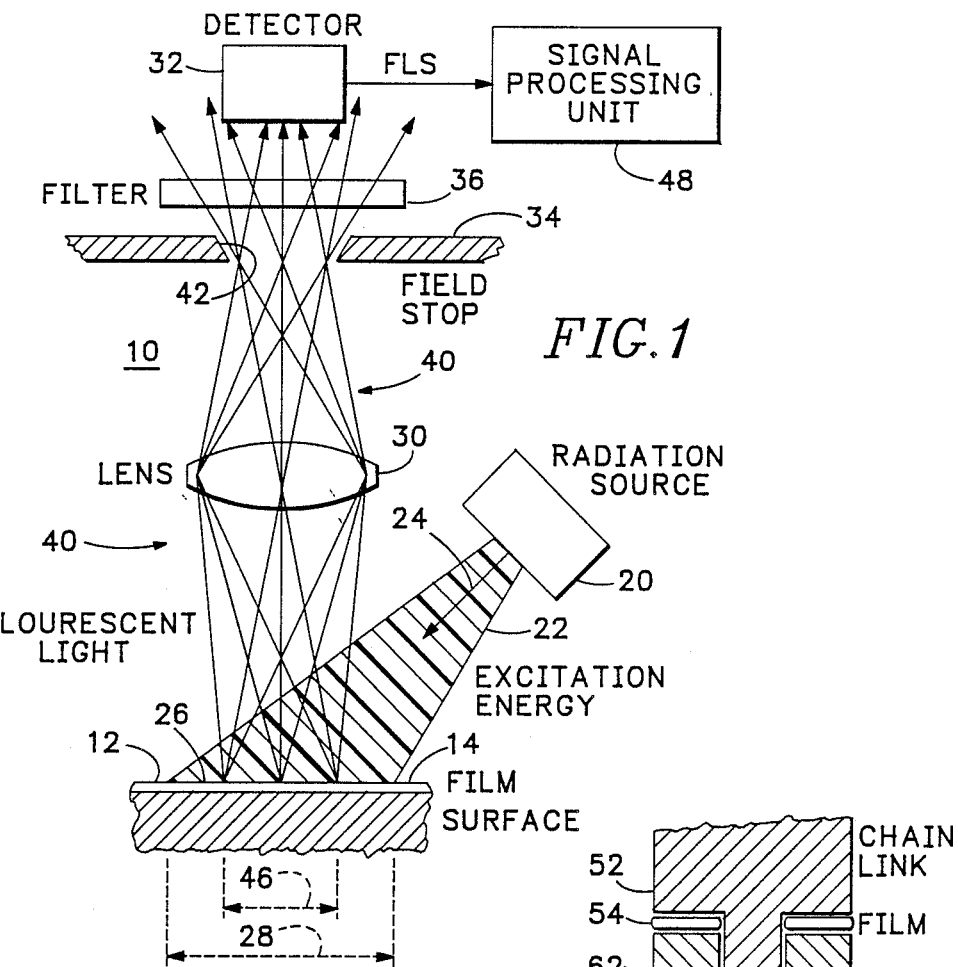
FIG. 1
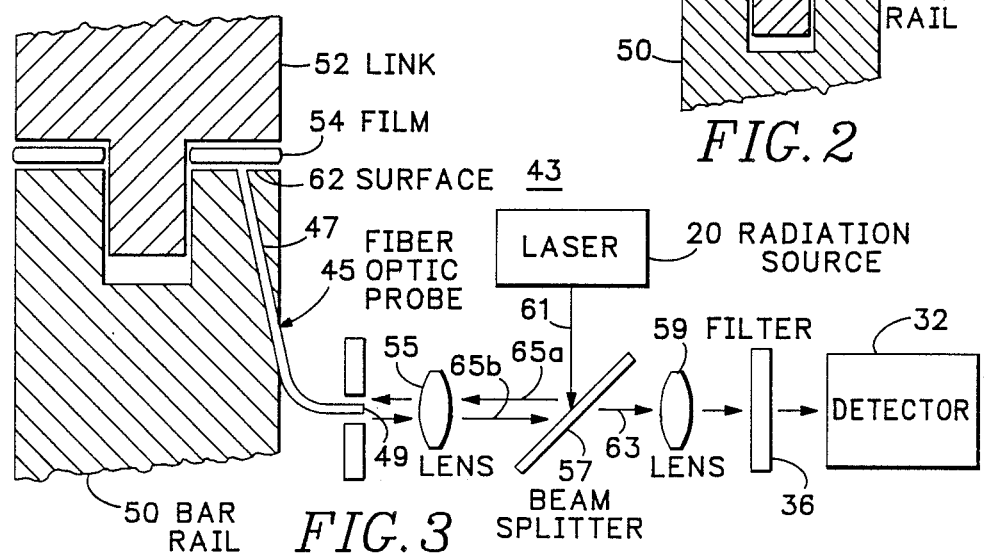
FIG. 2
FIG. 3

SYSTEM FOR MEASURING FILM THICKNESS

BACKGROUND OF THE INVENTION

The present invention relates to systems for measuring the thicknesses of thin films and relates especially to devices and methods for determining the thicknesses of oil films on machine parts.

It is frequently desirable to determine the thicknesses of thin films of materials for such purposes as quality assurance in coating operations and in order to investigate and monitor the condition of films of lubricating oil on machine components. It is difficult to measure the thicknesses of these films because they are often extremely thin, inaccessible and do not easily lend themselves to examination with conventional mechanical methods.

In particular, information about the thicknesses of films of oil on operating machinery is very difficult to obtain with existing technology since, among other things, such films are ordinarily obscured from direct observation. The problems inherent in measuring the thicknesses of oil films on operational machinery have frustrated many efforts to investigate and monitor the processes of lubrication critical to machinery performance.

It is therefore an object of the present invention to provide an improved system for quickly and accurately measuring the thicknesses of thin films.

It is another object of the present invention to provide an improved system for measuring the thicknesses of thin films of oil on operational machinery.

It is a further object of the present invention to provide an improved system for measuring the thicknesses of films which are ordinarily obscured from direct observation.

It is yet another object of the present invention to provide an improved system for measuring film thicknesses which system does not interfere with or damage the film itself.

SUMMARY OF THE INVENTION

The present invention relates to a system for determining the thicknesses of thin films of materials exhibiting fluorescence in response to exposure to forms of excitation energy such as blue-green or ultraviolet light. A section of the film is illuminated with a fixed intensity of such energy and the amount of fluorescent light produced by the film over a limited area within the illuminated section is then measured. For thin films, the amount of fluorescent light produced over a circumscribed area is a function of the volume of film material present and, more importantly, the thickness of the film. The thickness of the film can be determined by comparing the intensity of fluorescent light produced by the film with the intensities of light produced by similar films of known thicknesses when illuminated with the same intensity of excitation energy.

The preferred embodiment of the present invention is configured for measuring the thicknesses of oil films on machine components which are ordinarily obscured from view. Bluegreen light from an excitation energy source such as a laser is focused on one end of a single fiber optic element embedded below the surface on which the oil film to be investigated is resident while the opposite end of the fiber optic element is mounted flush with the surface. The fiber optic element is operative for transmitting and blue-green light from the source and flooding a selected volume of the film with this light. The fiber optic element is also connected to a mechanism for detecting fluorescent light through the use of a beam splitter for enabling the coaxial transmission of the excitation energy and fluorescent light. Accordingly, the fiber optic element is operative for transmitting fluorescent light to the detection mechanism from a limited area of said film within the volume illuminated by blue-green light. The fiber optic element forms a fiber optic "probe" that allows light to be transmitted to and from hidden surfaces which are not ordinarily subject to direct observation. The fluorescent light detection mechanism may constitute a photomultiplier tube used in combination with a long-wave pass optical filter adapted for passing the fluorescent light while blocking any blue-green light which may be reflected back down the probe.

In operation, the excitation energy is transmitted from the source thereof through the optical probe to the film and the material of the film fluoresces in response to exposure to this energy. A certain amount of the fluorescent light generated over the limited area in proximity to the embedded end of the fiber optic probe is collected and transmitted down the optical probe to the detection mechanism where the intensity of the fluorescence is measured. The intensity of light measured for a particular film under investigation is correlated with the intensities of light produced by films of known thicknesses whereby the thickness of the film may be ascertained.

The subject matter of the present invention is particularly pointed out and distinctly claimed in the concluding portion of this specification. However, both the organization and method of operation, together with further advantages and objects thereof, may best be understood by reference to the following description taken in connection with the accompanying drawings wherein like reference characters refer to like elements.

BRIEF DESCRIPTION OF THE DRAWINGS

FIG. 1 is a diagrammatic view of a simplified, conceptual system in accordance with the present invention illustrating its principles of operation;

FIG. 2 is a cross-sectional view of a conventional chain saw bar rail and a chain link associated therewith as separated by an oil film at the link-bar interface;

FIG. 3 is a diagrammatic view of a system representing the preferred embodiment of the present invention which utilizes an embedded fiber optic probe and allows the thicknesses of films on surfaces ordinarily obscured from view to be determined;

DETAILED DESCRIPTION

Figure 4:
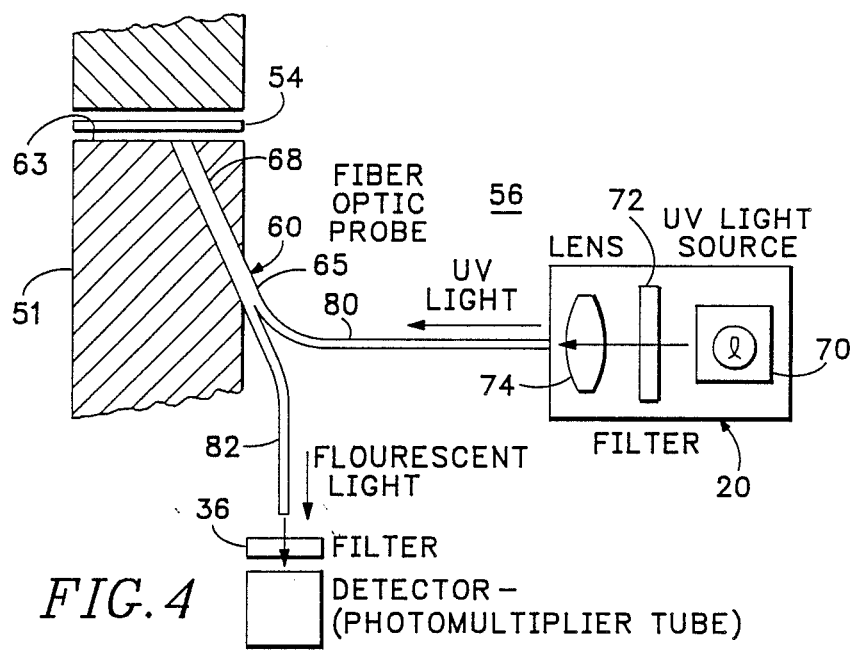
FIG. 4 is a diagrammatic view of an alternative embodiment of the present invention which also employs an embedded fiber optic probe having an alternative multi-element construction.

Referring now to FIG. 1, a system 10 demonstrating the principles of operation of the present invention is illustrated. The system 10 is operative for ascertaining the thickness of a film 12 of a material having fluorescent properties residing on a surface 14. The material of this film may be naturally fluorescent, as is the case with many petroleum products, or may have fluorescent properties induced in it through the addition of suitable dyes. A source 20 of excitation energy such as blue-green or ultraviolet light, typically in the range of 350-520 nm in wavelength, generates a beam 22 of radiation directed in accordance with arrow 24 toward a particular section 26 of the film 12, the boundaries of this section being indicated by the phantom lines 28.

The radiation within the beam 22 causes the film within the section 26 to fluoresce producing fluorescent light, typically in the range of 500-700 nm in wavelength, some of which is emitted in the direction of the lens 30, i.e., perpendicularly away from the film 12. The fluorescent light picked up by the lens 30 is directed toward detector 32 through the field stop 34 and filter 36. The arrows 40 are intended to diagrammatically illustrate the approximate paths of the fluorescent light from the film 12 to the detector 32.

The lens 30 suitably focuses the light to form an image in proximity to field stop 34 comprising an aperture 42 of fixed size positioned so as to limit the field of view of the detector 32 to a limited area of the film 12, the boundaries of which are indicated by phantom lines 46. The filter 36 is adapted for passing the longer wavelengths of light characteristic of the fluorescing material while blocking light having wavelengths shorter than approximately 450 nm in order to help prevent excitation energy from the source 20, as may be reflected by the film 12 or surface 14, from reaching the detector 32 and interfering with the fluorescent light detection process. Detector 32 comprises a sensing device such as a conventional photomultiplier tube or a silicon photocell whose spectral sensitivity and speed are matched to the anticipated fluorescence. The detector 32 provides an output signal FLS (fluorescent light signal) having a level that is a function of the intensity of the fluorescent light received by it. Signal processing unit 48, receiving the signal FLS, may comprise a microprocessor system operating under software control for processing the signal by correlating the level of the signal with levels of signals corresponding to films of known thicknesses and calculating film thickness based on comparisons of these signal levels.

Reviewing operation of the system 10 shown in FIG. 1, excitation energy from the source 20 is directed at a section 26 of the film 12 causing the film within this section to fluoresce. A certain amount of the fluorescent light produced by the film 12 in the limited area 46 within the section 26 is focused by the lens 30 and directed toward the detector 32 through the aperture 42. Detector 32 responds to the light passed by the long-wave pass filter 36 and produces a signal FLS that is a function of the intensity of the light received by the detector. The signal processing unit 48 uses the level of the signal FLS to compute an estimate of the thickness of the film in accordance with the procedure previously mentioned.

Referring now to FIG. 2, a chain saw conventionally includes an elongated bar rail 50 extending outwardly from the motor of the saw around which a cutting chain travels, the latter being made up of individual chain links 52. In operation, the chain links 52 slide over the bar rail 50 on a thin film 54 of lubricating oil covering the top surface 62 of the bar rail 50. The thickness of the film 54 would ordinarily be difficult to investigate with the system 10 shown in FIG. 1 because the film 54 is obscured from view due to the passage of individual links during operation of the saw. However, the embodiment of the present invention shown in FIG. 3 may be employed to measure the thickness of the film 54 even when the saw is operating and the film is not subject to direct observation.

Referring now to FIG. 3, the system 43 comprises a fiber optic probe 45 embedded in the bar rail 50 so as to extend upwardly to the surface 62 of the bar rail through the structure of the rail itself. The fiber optic probe 45 includes a single fiber optic element 47 mounted so as to have one of its polished end surfaces flush with the surface 62 of the bar rail 50 beneath the film 54. The fiber optic probe 45 is operative for bi-directionally transmitting light to and from the film 54 as will be described hereinafter.

The radiation source 20 comprises an argon ion laser emitting blue-green light having a wavelength of approximately 488 nm (or, alternatively, 514 nm) supplying the excitation energy used to stimulate fluorescence in the material of the film 54. This blue-green light from the laser source 20 is directed at the beam splitter 57 as indicated by the arrow 61 where it is reflected toward the lens 55 in accordance with the arrow 65a. The lens 55 focuses this light toward the proximal end 49 of the fiber optic probe 45 that then transmits this light up to the film 54. The blue-green light from the radiation source 20 stimulates longer wavelength fluorescence in the material of the film 54. Fluorescent light from a limited area within a section of the film 54 is picked up by the distal end of fiber optic probe 45 and transmitted down the probe toward the lens 55 for directing this light toward the beam splitter 57 in accordance with the arrow 65b. The beam splitter 57 allows a large portion of this light to be transmitted through the splitter and directed at the lens 59 as indicated by the arrow 63. The lens 59 focuses this fluorescent light at the filter 36 toward the detector 32. The filter 36 is operative for passing longer wavelengths of light such as the fluorescent light and blocking the transmission of any short-wave excitation energy as may be reflected from the film 54 or other parts of the system 43. The detector 32 comprises a photo multiplier tube responsive to the wavelengths that are characteristic of the fluorescence of the material of the film 54 and provides a signal indicative of the amount of fluorescent light picked up by the probe 45. The beam splitter 57 may comprise a partially reflective mirror or a holographic mirror constructed so as to reflect blue-green light but allow the transmission of the fluorescent light and thereby enable the coaxial transmission of the excitation energy and fluorescent light.

Reviewing the operation of the system 43 shown in FIG. 3, the excitation energy generated by the laser source 20 is directed up the fiber optic probe 45 to the film 54 where it stimulates fluorescence in the material of the film 54. The amount of fluorescence as takes place in the film 54 is proportional to the thickness of the film. The fiber optic probe picks up a certain amount of the fluorescent light generated within a limited area of the film in proximity to the end of the fiber optic element 47 of the fiber optic probe 45 and transmits this light down the probe 45. This light is then directed to the detector 32 that senses the intensity of the fluorescent light received by it, as filtered to remove any short-wave excitation energy, providing a signal indicative of the thickness of the film 54. The principles of operation of the system 56 shown in FIG. 3 are the same as the principles of operation of the system 10 shown in FIG. 1; however, the fiber optic probe 45 enables the excitation energy and fluorescent light to be transmitted to and from surfaces such as the surface 62 of the bar rail 50, normally obscured from view, so that the thicknesses of films on hidden surfaces can be determined.

Figure 5:
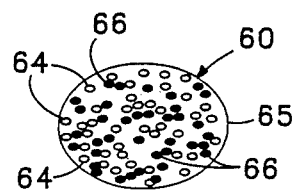
FIG. 5 is a cross-sectional view of the fiber optic probe component of the system shown in FIG. 4.

The system 56 shown in FIG. 4 is suitable for measuring thin films of material resident on comparatively wide surfaces and includes a bifurcated fiber optic probe 60 embedded in member 51 so as to extend upwardly to the surface 63 of the member 51 through the structure of the member itself. A plurality of fiber optic elements within the probe 60 may thereby be mounted flush with the surface 63 directly beneath film 54. As further illustrated in FIG. 5, the fiber optic probe 60 suitably includes two separate sets of fiber optic elements 64 and 66 within a casing 65, the fiber optic elements being spatially intermixed within the embedded part 68 (FIG. 4) of the probe 60 but divided in separate branches 80 and 82 connected with the source 20 and detector 32. The first set of fiber optic elements 64 extends between the ultraviolet light source 20 and the surface 63 of the bar rail 50 so as to transmit ultraviolet excitation energy from the source 20 to a section of the film 54. The second set of fiber optic elements 66 extends between the surface 63 of the rail 50 and the detector 32 so as to transmit fluorescent light from a limited area within the section of the film 54, as illuminated by ultraviolet light, to the detector 32.

The ultraviolet light source 20 includes a mercury arc lamp 70 and a filter 72 operative for passing light shorter than approximately 450 nm in wavelength and blocking light longer than approximately 450 nm in wavelength. The short-wave pass filter 72 eliminates substantial amounts of visible light from the beam of light ordinarily produced by the mercury arc light lamp 70 as might otherwise be reflected by the film 54 and interfere with the fluorescent light detection process. The lens 74 merely focuses the ultraviolet light from the light source 70 into the branch 80 of the fiber optic probe 60 containing the set of fiber optic elements 64 used for transmitting the ultraviolet light to the film 54. The fluorescent light from the film 54 transmitted by the set of fiber optic elements 66 is directed at the detector 32 by way of the branch 82 through the long-wave pass filter 36 blocking transmission of shorter wavelengths of light.

Reviewing the operation of the system 56 shown in FIG. 4, ultraviolet light generated by the mercury lamp 70 and short-wave pass filter 72 is directed through the fiber optic elements 64 of the probe 60 to the film 54. Fluorescent light caused by the exposure of the film 54 to the ultraviolet light is directed through fiber optic elements 66 of the probe 60 through the long-wave pass filter 36 to the detector 32. The intensity of this fluorescent light provides a measure of the thickness of the film 54.

Figure 6:
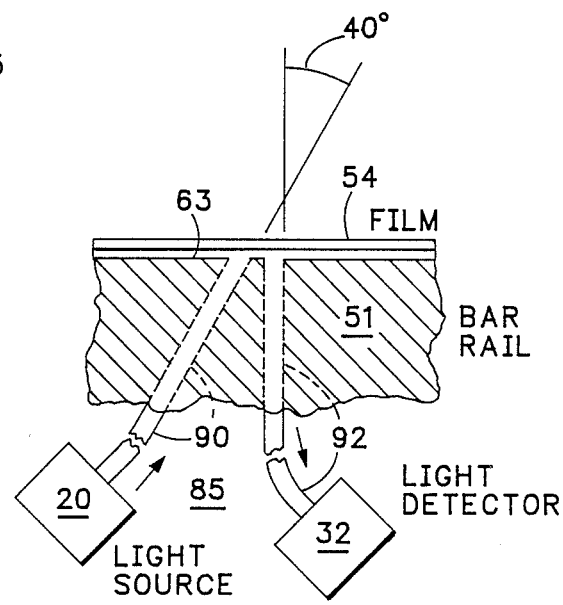
FIG. 6 is a diagrammatic view of an alternative embodiment of the present invention utilizing separate fiber optic probes for the transmission of the excitation and the fluorescent energy.

Referring now to FIG. 6, an alternative system 85 employing a pair of fiber optic probes 90 and 92 is illustrated. In accordance with this system, the separate probes 90 and 92 are used to house different fiber optic elements carrying the excitation energy and the fluorescent light, and direct light from the light source 20 to the film 54 and from the film 54 to the light detector 32. Each of the probes 90 and 92 are embedded in the bar rail 50 so as to allow the fiber optic elements within the probes to be mounted flush with the surface 62 of the rail 50. In practice, it has been found that the probes 90 and 92 should preferably be aligned at approximately a 40° angle with respect to one another for allowing the volume illuminated with excitation energy from the source 20, and the area from which fluorescent light is picked up for transmission to the detector 32, to satisfactorily overlap, while minimizing the reflection of excitation energy from the film 54 down the probe 92.

Figure 7:
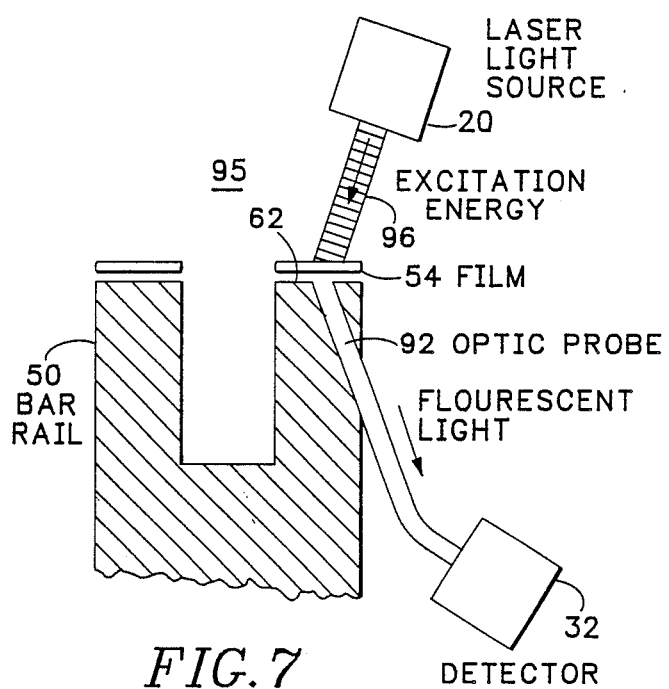
FIG. 7 is a diagrammatic view of another alternative embodiment of the present invention utilizing a single fiber optic probe in combination with a source which directly illuminates the subject film with the excitation energy.

Referring now to FIG. 7, another alternative system 95 employs a single fiber optic probe 92 for transmitting the fluorescent light. In system 95, the film 54 is illuminated from above by a beam 96 of excitation energy generated by a laser light source 20. Fluorescent light produced as a result of this exposure is, however, transmitted to the detector 32 through fiber optic elements in the probe 92 embedded in the bar rail 50. This procedure for direct illumination in combination with fiber optic pick up of the fluorescent light can be useful when it is possible for the film 12 to be illuminated with excitation energy (light) from an oblique angle above the surface 62, but it may nevertheless be difficult to pick up the resulting fluorescent light.

While several embodiments of the present invention have been shown and described, it will be apparent to those skilled in the art that many changes and modifications may be made without departing from the invention in its broader aspects. The appended claims are therefore intended to cover all such changes and modifications as fall within the true spirit and scope of the invention.

We claim:

1. A method for measuring the thickness of a thin film of material on a surface of a body, said film having fluorescent properties, comprising the steps of:

illuminating a section of said film with excitation energy suitable for stimulating fluorescence in the material of the film;

measuring from within said body underneath the surface upon which said film resides the intensity of the fluorescent light produced over a limited area within said section of film; and correlating said intensity with the intensities of fluorescent light produced by established film thicknesses in order to determine the thickness of said film.

2. The method of claim 1, wherein said step of measuring the intensity of said fluorescent light includes the steps of:

filtering the light from said film so as to pass only the long-wave components thereof; and detecting the amount of longer wavelength light generated by said area of said film in accordance with fluorescent effects.

3. The method of claim 1 wherein said step of illuminating said film includes the steps of:

generating light with a mercury arc lamp;

filtering this light so as to pass only the short-wave components thereof; and directing the high frequency light produced in accordance with said filtering step at said section of said film.

4. The method of claim 1 wherein said film of material comprises a layer of lubricating oil and said excitation energy comprises blue-green light.

5. The method of claim 1 wherein said film of material contains a fluorescent dye suitable for inducing fluorescent properties in the film.

6. The apparatus according to claim 1 wherein the step of measuring is accomplished via a fiber optic element extending in substantially flush relation to said surface and said film.

7. The method of claim 1 wherein the step of illuminating said film comprises:
generating light with a laser, and
directing the generated light at said section of film.

8. An apparatus for measuring the thickness of a thin film of material having fluorescent properties on a surface of a body wherein said surface cannot be directly observed, comprising:
a source of excitation energy suitable for stimulating fluorescence in the material of the film;
detection means for measuring fluorescent light intensity;
a fiber optic probe mounted within said body and extending to said surface, said probe being connected to said detection means for transmitting fluorescent light from said surface to; and
means coupled to said detection means for providing an output responsive to film thickness.

9. The apparatus of claim 8 wherein said fiber optic probe comprises a single fiber optical element.

10. The apparatus of claim 9 wherein the end of said fiber optical probe element proximate said surface is flush with said surface wherein said thin film extends thereover.

11. The apparatus of claim 8 wherein said light source includes an ragon ion laser which emits blue-green light.

12. The apparatus of claim 8 wherein said detection means for detecting fluorescent light includes:
means for filtering the light from said film so as to only pass the long wave components thereof; and
a photomultiplier tube responsive to the fluorescent light.

13. The apparatus of claim 8 wherein said thin film of material comprises a layer of lubricating oil and said excitation energy comprises blue-green light having a wavelength of approximately 488 nm.

14. The apparatus of claim 13 wherein said body comprises the chain bar rail of a chain saw.

15. The apparatus of claim 8 wherein said probe is also coupled to said light source for transmitting excitation energy from said source to said surface.

16. The apparatus of claim 8 including a second fiber optic probe mounted in said body and extending to said light excitation source for transmitting excitation energy from said source to said surface.

17. The apparatus of claim 16 wherein said second fiber optic probe comprises a single fiber optical element.

18. The apparatus of claim 16 wherein said second fiber optic probe is disposed at an angle to the first mentioned fiber optic probe.

19. The apparatus of claim 8 wherein said source of excitation energy includes:
a source of ultraviolet light; and
means for directing said ultraviolet light at said section of said film.

20. The apparatus of claim 19 wherein said source of ultraviolet light comprises a mercury arc lamp and a short-wave pass light filter.

21. The apparatus of claim 8 wherein said film of material comprises lubricating oil and said energy comprises blue-green light.

22. The apparatus of claim 8 wherein said film of material contains a fluorescent dye suitable for inducing fluorescent properties in said film.

23. An apparatus for measuring the thickness of a thin film of material having fluorescent properties on a surface of a body wherein said surface cannot be directly observed, comprising:
a source of excitation energy suitable for stimulating fluorescence in the material of the film;
detection means for measuring fluorescent light intensity; and
a fiber optic probe mounted in said body and a extending to said surface, said probe containing a first set of fiber optic elements connected to said detection means for transmitting fluorescent light from said surface of said detection means; and
means coupled to said detection means for providing an output responsive to film thickness.

24. The apparatus of claim 23 wherein said energy source includes a mercury arc lamp and a short-wave pass filter which are operative for generating ultraviolet light.

25. The apparatus of claim 23 wherein said detection means for detecting fluorescent light includes:
means for filtering the light from said film so as to pass the long-wave components thereof; and
a photomultiplier tube responsive to fluorescent light.

26. The apparatus of claim 23 wherein said thin film of material comprises a layer of lubricating oil.

27. The apparatus of claim 23 wherein said probe also contains a second set of fiber optic elements connected to said energy source for transmitting excitation energy from said source to said surface.

28. The apparatus of claim 27 wherein the fiber optic elements of said second set are interspersed with the fiber optic elements of said first set.

29. The apparatus of claim 23 wherein said energy source comprises a laser.

* * * * *

UNITED STATES PATENT AND TRADEMARK OFFICE
CERTIFICATE OF CORRECTION

PATENT NO. : 4,956,558

DATED : September 11, 1990

INVENTOR(S) : Charles R. Batishko et al.

It is certified that error appears in the above-identified patent and that said Letters Patent is hereby corrected as shown below:

Column 1, line 62, delete "Bluegreen" and insert --Blue-green--.

Column 1, line 68, after "transmitting" delete "and" and insert --the--.

Column 7, line 36, delete "ragon" and insert --argon--.

Column 7, line 26, after "said surface to" insert --said detection means--.

Column 7, line 41, delete "long wave" and insert --long-wave--.

Column 8, line 33, after "surface" delete "of" and insert --to--.

Signed and Sealed this

Seventh Day of January, 1992

Attest:

HARRY F. MANBECK, JR.

Attesting Officer    Commissioner of Patents and Trademarks